April 4, 1967 R. B. McCREADY ETAL 3,312,544

METHOD AND APPARATUS FOR MAKING STEEL

Filed Dec. 16, 1965 5 Sheets-Sheet 1

INVENTOR.
ROSS B. McCREADY
KLAUS W. FORSTER
BY Hoffmann and Yount
ATTORNEYS

FIG. 2

INVENTOR.
ROSS B. MCCREADY
KLAUS W. FORSTER
BY Hoffmann and Young
ATTORNEYS

INVENTOR.
ROSS B. McCREADY
KLAUS W. FORSTER
BY Hoffmann and Yount
ATTORNEYS

United States Patent Office 3,312,544
Patented Apr. 4, 1967

3,312,544
METHOD AND APPARATUS FOR
MAKING STEEL
Ross B. McCready, Alliance, and Klaus W. Forster, Brecksville, Ohio, assignors to Kerma Corporation, Alliance, Ohio, a corporation of Ohio
Filed Dec. 16, 1965, Ser. No. 514,321
13 Claims. (Cl. 75—60)

This application is a continuation-in-part of my co-pending application, Ser. No. 378,700, filed June 29, 1964, entitled, "Method and Apparatus for Making Steel," now abandoned, the disclosure of which including the specification, drawings, etc., are incorporated herein by reference.

The present invention relates to steel making and more particularly to a method of and apparatus used in the making of steel.

Present day basic oxygen steel-making installations include a pivotally mounted steel-making vessel sometimes referred to as the "furnace," but herein referred to as the "vessel" which requires relining and/or other servicing periodically, usually about every two weeks. The present practice is to reline and otherwise service the vessel while it is in place in its normal operating position in what is herein referred to as the vessel. This takes approximately three or more days and of necessity, the vessel is out of production during this period of time. Where the steel is being supplied to a processing installation which requires a constant or substantially constant supply of metal an additional vessel or vessels must be provided over the number which would be required if the vessels could be operated continuously in order to assure continuous operation of a sufficient number of vessels to meet the demand for metal. For example, in a small steel-making installation of the type referred to, which only would require one steel-making vessel, if the vessel could be operated continuously, it is necessary to provide an additional or second vessel in order that a continuous or substantially continuous supply of metal is available at all times. The necessity of providing an additional vessel or vessels increases the cost of the operation, etc.

According to the provisions of the present invention, the steel-making vessel is removed from its normal operating position in its auxiliary apparatus, herein called the furnace, for example, the lance and/or charging apparatus, etc., and transported to a service and/or storage area for relining, etc., and while being serviced, replaced by a second vessel so as to make maximum use of the auxiliary apparatus and carry on the steel-making operation continuously or substantially continuously at the required capacity thereby reducing the cost of the over all operation.

The principal object of the present invention is the provision of a new and improved apparatus for making steel, a method of operating the same which will enable the auxiliary equipment which is herein referred to as the furnace, to be operated continuously or substantially so.

Another object of the invention is the provision of a novel steel-making apparatus comprising a furnace structure including a steel-making vessel, a trackway extending from beneath the vessel within the furnace to a service area without the furnace, and a vessel-carrying car movable on the trackway for transporting the vessel from a position within the furnace to a service and/or storage area and vice-versa.

Another of the principal objects of the invention is the provision of a novel vessel-carrying car having a wheeled truck or trucks in engagement with a trackway comprising intersecting tracks and wherein the car is provided with means for transferring the truck or trucks from one track to another track, thereby providing a vessel-carrying car which does not require any turning radius and which is maneuverable in close quarters.

Another object of the invention is the provision of a new and improved vessel-carrying car, as defined in the preceding object, wherein the means for transferring the truck or trucks from one track to another track comprises a plurality of jacks for lifting the car and disengaging the truck or trucks from one of the tracks and means for rotating the truck or trucks to a position to engage the other of the tracks when the car is lowered by the jacks.

Another object of the invention is the provision of a new and improved steel-making furnace apparatus or installation having a removable steel-making vessel supported therein in such a manner that it can be readily disconnected and removed from its supports, and an access opening sufficiently large to permit passage therethrough of the steel-making vessel and a transport car used for removing the vessel.

The invention resides in certain constructions and combinations and arrangements of parts of a steel-making apparatus or installation and the performance of certain operations and further objects and advantages of the invention will be apparent to those skilled in the art to which it relates from the following description of the preferred embodiment described with reference to the accompanying drawings forming a part of this specification in which similar reference characters designate corresponding parts, and in which:

Referring to the drawings, the steel-making apparatus or installation shown comprises a steel-making vessel B readily removed through a side of the furnace structure, indicated generally by the reference character A, by a vessel carrying transport vehicle or car C operable over a trackway, indicated generally by reference character D, extending from beneath the vessel to a remote service area E.

The steel-making apparatus shown in the drawings is a part of an over-all basic oxygen-type steel-making installation. The apparatus A may be of conventional construction and is provided with an access opening 12 in the front thereof. It will, of course, be understood that the furnace, that is, the apparatus A could be provided with an access opening in the rear rather than in the front or be provided with openings in both the rear and the front. Since the furnace A may be of a conventional construction, it will not be described in detail and only those parts which are necessary to understand and to carry out the provisions of the present invention will be described.

The access opening 12 in the front of the furnace A is the opening shown between a pair of laterally spaced vertical support columns 13, 14 comprising a part of the furnace A and between an upper horizontal support member or steel beam 15 supported by the columns 13, 14 and the floor of the installation. The opening 12 is of a size such that the transfer car C and steel-making vessel B can readily pass therethrough.

The steel-making vessel B may be of a conventional construction and is a container having an opening 16 at its top through which the various steel-making materials are introduced and from which molten steel and slag are poured. The vessel B is supported or cradled in an annular trunnion ring or member 17 extending circumferentially around the mid-portion of the vessel B and the construction is preferably such that the vessel can be removed from the ring. The member 17 is provided with trunnions in the form of shafts 18, 19 which extend laterally outwardly thereof at diametrically opposed locations with the purpose of pivotally supporting the vessel B on upstanding supports or stands 20, 21 located within the furnace A. The shafts 18, 19 project into annular bearing members 24 and 25 which surround and rotatably support the trunnions 18 and 19, respectively. The annular members 24, 25 seat within complementary upwardly facing recesses contained within the supports 20, 21. Detachable straps, not shown, may be provided for the purpose of retaining the members 24, 25 within their respective recesses on the supports 20, 21. The shaft 19 projects through the bearing member 25 and is coupled by a detachable coupling 26 to the output shaft 27 of a speed reducer 28, the driven shaft 29 of which is connected by a detachable coupling 30 to a motor 31 operable to pivot the vessel B about the axis 32 of the shafts 18, 19.

The drive means including the speed reducer 28 and the motor 31 is suitably supported by the support column 21 and the coupling 26 is of the type which may be readily disconnected so that the vessel B and its trunnion ring 17 can be readily removed as a unit from its supports 20, 21. Preferably both trunnions and the drive means will be protected by suitable covers or hoods having one of their ends pivotally connected to the supports 20, 21 so that they can be readily swung out of the way to permit access to the coupling 26 and the detachable straps or caps, if such are employed, when it is desired to remove or replace the vessel B.

The trackway D comprises a plurality of tracks 50–52, each having a pair of spaced running rails which are supported and mounted upon a suitable steel or concrete bed structure forming the floor or a part of the floor of the steel-making installation. The tracks are preferably of the same gauge as the gauge of conventional tracks over which ladle and slag cars are operated so that these cars may be operated in their usual manner thereover.

The track 50 extends from the rear of the furnace A and perpendicularly of the pivot axis 32 of the shafts 18, 19 through the access opening 12 to a position outside of the furnace. The track 51 is located within the furnace A and perpendicularly intersects and extends laterally outwardly of both rails of the track 50. The location of the track 51 is such that a right vertical plane passing through the pivot axis 32 bisects the track along a line extending midway between the rails thereof. The track 51 is provided in order to enable the transfer car C to be moved laterally between the supports 20, 21 so that the position of the vessel B may be laterally adjusted prior to its being placed upon the supports 20, 21 as will be more fully explained hereinafter. The track 52, in the preferred embodiment, perpendicularly intersects the track 50 outside of the furnace A and extends therefrom in one direction to a remote location containing the service area E and in the other direction to a remote location containing a storage area G.

Figure 3:
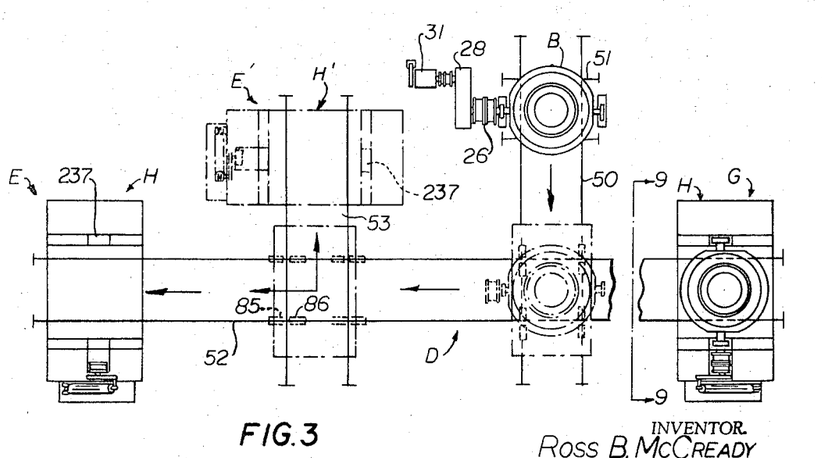
FIG. 3 is a plan view of the trackway employed with and forming a part of the apparatus shown in FIGS. 1 and 2.

If it is not feasible to locate the service area E along the track 52 or if it is desired to locate it in an area spaced therefrom, any suitable track arrangement may be provided, for example, an additional track 53 perpendicularly intersecting the track 52 and extending to an alternate service area E' may be provided. The same provision can also be made for the storage area G, if desired. While the service and storage areas E and G are shown in FIG. 3 to be located to the left and right, respectively, of the track 50, it will, of course, be understood that their relationship could be reversed, that both areas could be located adjacent each other, or that one area could serve both purposes, etc. It is also to be understood that the tracks employed other than the tracks 50, 51, need not intersect one another perpendicularly.

The vessel carrying transfer car C, in the preferred embodiment, comprises a generally horizontal weldment or built up frame 60 supported on the trackway D by a plurality of wheeled trucks 62 connected to the frame for pivoted movement about a generally vertical axis and engaging the trackway D, a revolving platform 64 also mounted on the frame means 60 for pivotal movement about a generally vertical axis, hoist or lifting mechanism 66 mounted upon the revolving platform 64 for lifting the vessel B from its supports, transfer means including downwardly extending jacks 68 connected to the frame 60 for lifting the car C to permit transfer of the trucks 62 from one track to another track, and a drive means 70 for operating the car over the trackway D.

The horizontal frame 60 comprises a pair of laterally spaced longitudinally extending members 72, 73 and a plurality of longitudinally spaced transverse members 75 having their ends welded to the inner sides of the members 72, 73. The members, as shown in the preferred embodiment, are made from steel plates welded together so as to form hollow beams rectangular or square-shaped in cross-section. The resultant frame 60 is in effect a unitary rigid horizontal platform having the capacity to support extremely heavy loads.

The transfer car C, as shown, has four trucks 62, one located beneath and adjacent to each corner of the horizontal frame 60. Since all of the trucks are identical, only the truck shown at the near left side of FIG. 1 will be described in detail. The truck 62 referred to comprises an elongated U-shaped structural or channel member 82 having cut-out or recessed portions at opposite ends within which suitable flanged track engaging wheels 85 and 86 are rotatably suported on shafts 87 and 88, respectively, extending through aligned apertures in the U-shaped channel member 82. The channel member 82 in turn is pivotally connected to another U-shaped channel member 90 superposed over the mid-portion of the channel member 82 by a pin or shaft 91 extending through aligned apertures within the respective side flanges of the two channel members. The member 90 has a flat upper surface 92 which is in engagement with the member 72 of the frame and from which projects a stem 93 extending through an opening in the lower plate 94 of the member 72. The upper end of the stem 93 is threaded and provided with nuts 95 which maintain the truck connected to the member 72.

To enable the flanged wheels to be operated over the tracks at the various intersections, the rails of the tracks at their point of intersection are provided with gaps. However, with respect to the intersection of the tracks 50 and 51, only the rails of the track 51 need be provided with gaps, since the distance of travel over the track 51, in either direction, will not exceed one-half the distance between the flanged wheels of the trucks.

Figure 5:
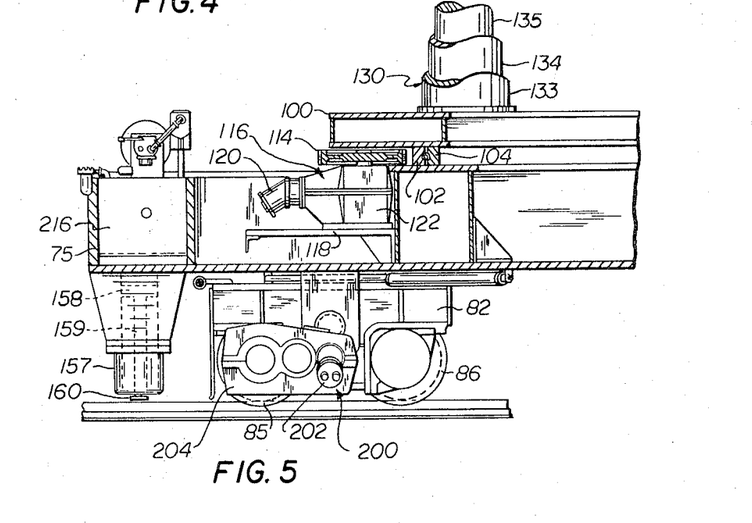
FIG. 5 is a fragmentary sectional view approximately on line 5—5 of FIG. 4.

The revolving platform 64 comprises an annular generally horizontally disposed frame member 100 welded or otherwise secured to the upper side of an annular member 102, see FIG. 5. The annular member 102 is adapted to be rotatably supported about a vertical axis extending through its center by another annular member 104 concentric therewith. The annular member 104 is welded or otherwise secured to the transverse members 75 of the frame 60 located intermediate the ends thereof. The members 102 and 104 are provided with circumferential grooves or races which face each other and in which a plurality of circumferentially spaced thrust bearings 110 are disposed for the purpose of enabling the member 102 to be rotatably supported by the member 104. The member 102 is provided with external gear teeth 112 extending around a portion of its circumference, preferably about 110°, and is adapted to be rotated by a pinion gear 114 in mesh with the gear teeth 112. The pinion gear 114 is part of a drive unit 116, suitably supported on a bracket 118 secured to the leftmost intermediate transverse member 75, as viewed in FIG. 5, of the frame 60. The drive unit 116 comprises a conventional rotary type hydraulic motor 120 operatively connected to the pinion gear 114 via a suitable gear reduction unit 122.

Figure 1:
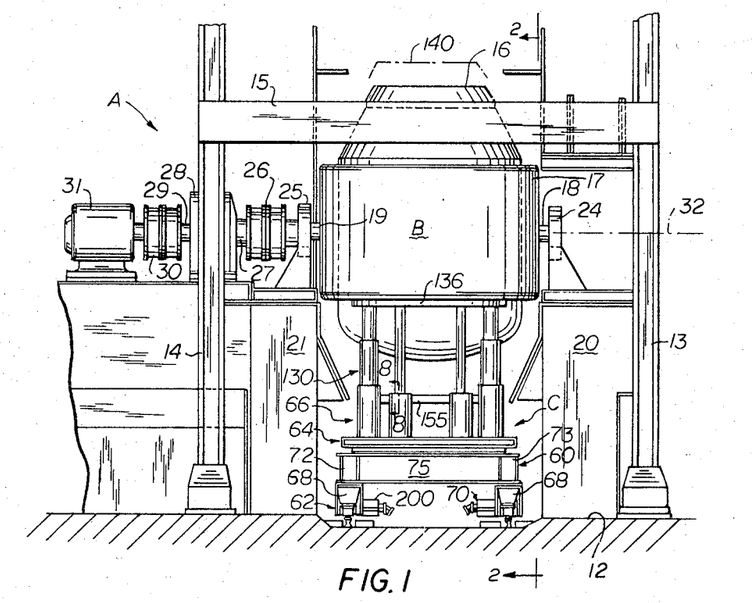
FIG. 1 is a fragmentary elevational view of a steel-making apparatus embodying the present invention.

The hoist or lifting mechanism 66, in the preferred embodiment, comprises a plurality of, preferably four, spaced apart upwardly extending, fluid operated, extensible elements or jacks 130 which are bolted or otherwise secured to the annular member 100 of the platform 64. Since all of the elements 130 are identical, only the element shown at the near left side of FIG. 1 will be described in detail. The element 130 referred to comprises a plurality of, preferably three, telescoping members 133, 134, and 135. The lowermost member 133 is a cylinder and is rigidly secured to the annular member 100. The intermediate member 134 is in the form of a piston or plunger slidably received within the cylinder 133 and linearly movable a fixed maximum distance relative thereto. The member 135 also is in the form of a piston or plunger and is slidably received within the member 134 and linearly movable a fixed maximum distance relative to the member 134. The upper ends of the two nearest and two furthest elements 130, as viewed in FIG. 1, are rigidly connected to arcuate horizontally disposed members 136 and 137, respectively.

The extensible element or jack 130 is actuated to an extended position by hydraulic fluid under pressure supplied to the element 130 from a suitable source and to a retracted position by exhausting the fluid contained within the element 130 to a reservoir.

Figure 2:
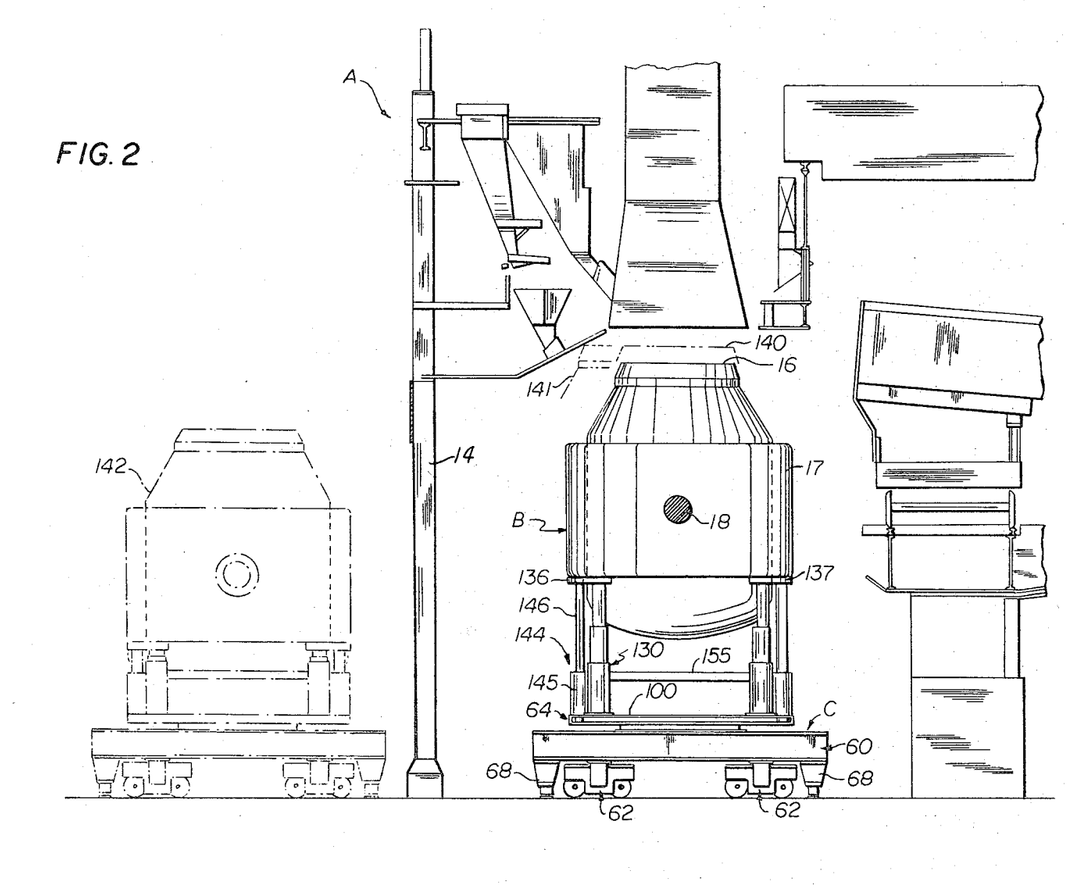
FIG. 2 is a fragmentary sectional view of the apparatus shown in FIG. 1, approximately on the line 2—2 of FIG. 1.

When it is desired to remove or lift the vessel B from one of its supports, such as its furnace support, the car C is moved to a position directly beneath the vessel B and the elements 130 are supplied with hydraulic fluid to extend them in an upward direction. As the elements 130 are being extended upwardly the arcuate members 136 and 137 will engage the undersurface of the annular member 17 and lift the vessel B from its supports, it being understood that the coupling 26, etc. will have been disconnected prior to lifting the vessel B from its supports. The vessel B is lifted to a position such that the bearing members 24, 25 are entirely disposed above the supports 20, 21, which position is indicated by the phantom lines 140 in FIGS. 1 and 2. The car C is then moved toward the opening 12 and away from the supports 20, 21 to a position indicated by the dotted lines 141 of FIG. 2. While in this position, the extensible elements 130 are lowered by exhausting the hydraulic fluid therefrom to a retracted position, as indicated by the phantom lines 142 of FIG. 2. The vessel B is then transported over the trackway D to the service area E or E' while the hoist mechanism 66 remains in its retracted position.

The hoist mechanism 66 further includes a plurality of, preferably four, vertically disposed safety devices 144 supported on the annular support member 100 and operable to prevent the vessel B from being dropped in the event the hoist mechanism 66 collapses due to a hydraulic power failure. Two of the devices 144 are located between the two nearest elements 130, as viewed in FIG. 1 and two of the devices are located between the furthest elements 130. Since all of the devices 144 are identical, only the device shown at the near left side of FIG. 1 will be described in detail.

Figures 6, 7, 8:
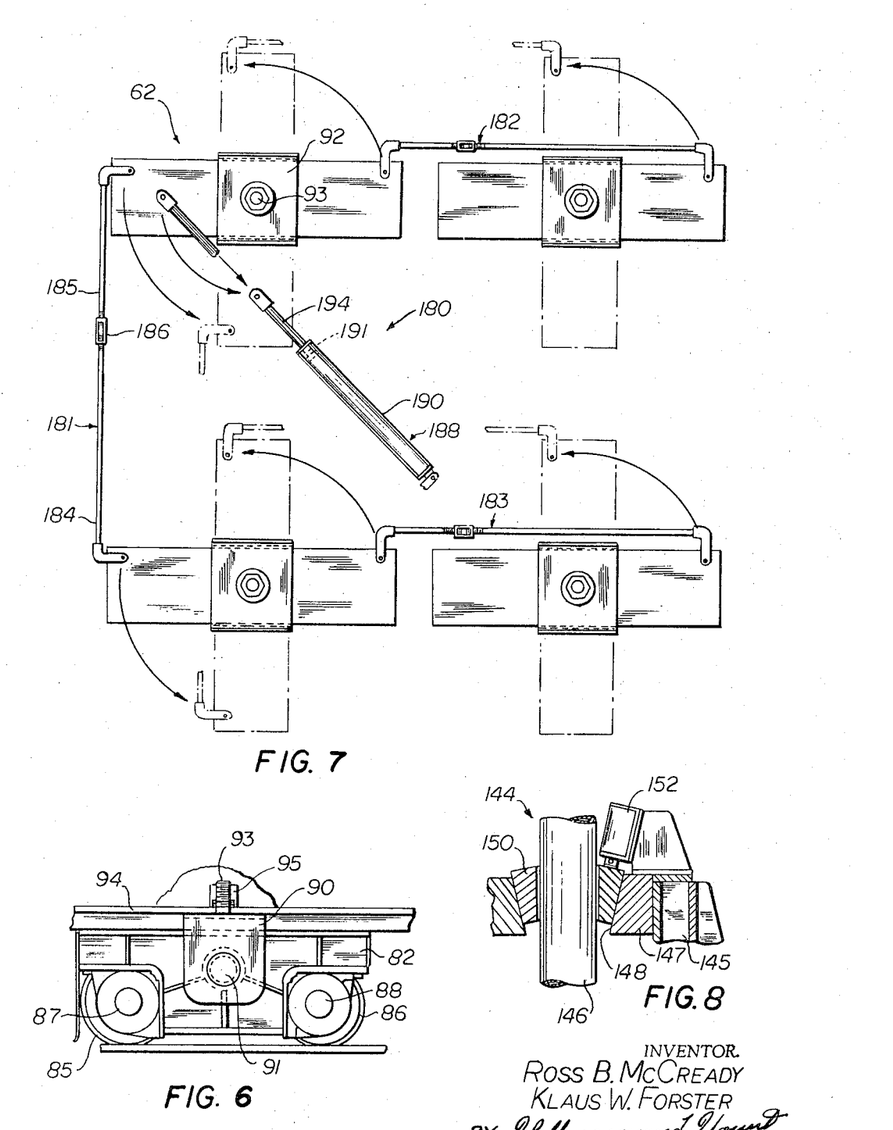
FIG. 6 is a fragmentary elevational view of the transfer car looking in the direction of the lines 6—6 of FIG. 4.
FIG. 7 is a diagrammatic plan view of a portion of the transfer car.
FIG. 8 is a fragmentary sectional view taken approximately on line 8—8 of FIG. 1.

The device 144 referred to comprises a hollow cylinder 145 rigidly mounted on the support member 100 and a rod 146 movable through the cylinder 145 and an aligned aperture within the annular member 100. The upper end of the rod 146 is secured to the arcuate member 136 and is movable with the latter when the elements 130 are extended or retracted. As best shown in FIG. 8, an annular member 147 is mounted within the uppermost end of the hollow cylinder 145. The member 147 has a tapered wall surface 148 inclined toward the axis of the cylinder 145. Disposed between the wall surface 148 and the rod 146, are one or more arcuate wedge elements 150, preferably two such elements, having inner and outer surfaces which are complementary with the rod and the inclined wall. The wedge elements 150 are adapted to be held in an upward non-wedging position by solenoids 152 attached thereto and mounted on the outer end of the annular member 147 and the upper end of the cylinder 145.

The solenoids 152 are all inter-connected in a series circuit and when energized, hold the wedge elements 150 in their upward non-wedging position. This series circuit, not shown, includes a pressure responsive switch which is responsive to the pressure of the hydraulic fluid supplied to the elements 130. When the pressure of the hydraulic fluid drops below a predetermined value, the switch will open and break the circuit containing the solenoids 152 and de-energize the solenoids. When the solenoids 152 are de-energized, the wedge elements 150 will drop by gravity and wedgingly engage the outer surface of the rod 146 and the inclined wall surface 148 and prevent the rods 146 from moving in a downward direction through the cylinder 145, and thus, prevent the vessel B from being dropped. The wedge elements 150 can be provided with knurled surfaces, if desired, so as to insure a tight wedging grip.

To prevent the extensible elements 130 and the safety devices 144 from buckling or bowing outwardly, cross or transverse brace members 155 are provided rigidly interconnecting the adjacent cylinders 133 and/or cylinders 145.

The transfer means for transferring the trucks of the car C from one track to another track comprises jacks 68 for lifting the entire car C to a vertical position such that the flanged wheels 85, 86 of the trucks 62 are disposed above the rails of the tracks and means, indicated generally by reference character 180, for rotating the trucks to a position in which the wheels thereof are aligned with the other track while the car is held in the lifted position. Preferably four jacks 68 are employed, one being located beneath each of the four corners of the frame 60. Since all of the jacks are identical, only the jack shown at the near left side of FIG. 1 will be described in detail. The jack 68, referred to, may be suitably welded or otherwise secured to the underside of the frame 60 and comprises a cylinder 157 having a double acting piston 158 slidably received therein. The piston 158 is rigidly connected to a piston rod 159 which projects through the lower end wall of the cylinder and is provided with a horizontal support member 160 at its outer end. The opposite ends of the cylinder are adapted to be selectively supplied with hydraulic fluid under pressure from a suitable source for the purpose of lowering or raising the member 160. To raise the car C, hydraulic fluid is supplied to the upper end of the cylinder 157 to cause the piston 158 to move downwardly until the member 160 engages the floor of the steel-making installation. The downward movement of the piston causes the fluid contained in the lower end of the cylinder to be exhausted to a reservoir. When the member 160 is engaged with the floor, continued relative movement between the piston 158 and the cylinder 157 will cause the cylinder to be moved upwardly and raise the car C. To lower the car C from its raised position, hydraulic fluid is supplied into the lower end of the cylinder 157 and exhausted from the upper end thereof, which causes the cylinder to move downwardly relative to the piston 158 until the wheels 85, 86 of the car C engage the track to which they are to be transferred. Continued relative movement between the piston 158 and the cylinder 157 will cause the piston 158 to be moved upwardly to a position in which the member 160 is disposed above the floor of the steel-making installation.

The means 180 for rotating the trucks comprises a tie member 181 connected laterally between the two leftmost trucks 62 and tie members 182 and 183 connecting the two upper and the two lower longitudinally aligned trucks together, as viewed in FIG. 7. Since all of the tie members are identical, only the tie member 181 will be described in detail. The tie member 181 at its respective ends is pivotally connected to the adjacent horizontally disposed portion of the channels 82 by pivot pins. The tie member 181 comprises a pair of rods 184, 185 having adjacent threaded ends threadably secured within a turn buckle 186 for adjusting the length thereof. The trucks 62 are adapted to be rotated by a conventional double acting reciprocating fluid motor 188 comprising a cylinder 190 having a piston 191 slidably received therein. The cylinder 190 is pivotally connected at one end to a bracket 192 secured to the underside of one of the intermediate transverse members 75. The piston 191 is connected to a piston rod 194 which projects through the other end of the cylinder. The outer end of the piston rod is pivotally connected to the top of the horizontally disposed portion of the channel 62 of one of the trucks, the upper left truck, as shown in FIG. 7.

The fluid motor 188 is adapted to be selectively actuated between an extended position and a retracted position by hydraulic fluid under pressure selectively supplied to the opposite ends of the cylinder 190. The length of the stroke of the fluid motor is such that when it is actuated between its extended and retracted positions, the trucks will be rotated 90°, which is the preferred angle of intersection of the tracks. It will of course be understood that if tracks are employed which do not intersect each other perpendicularly, the stroke of the fluid motor employed could be varied accordingly or suitable stop means employed to limit the length of the stroke.

To transfer the car C from one track to another track, the car C is moved to the intersection of two of the tracks such that the flanged wheels 85 and 86 of the trucks 62 straddle the rails of the track to which it is to be transferred, as shown in FIG. 3. The jacks 68 are then extended to engage the floor and lift the car C upward to a vertical position in which the wheels 85 and 86 of the trucks 62 are disposed above the rails and the fluid motor actuated to rotate the truck 62 to which it is connected about its vertical axis 90°, as shown in the phantom lines in FIG. 7, to a position in which the wheels 85, 86 of the truck 62 are aligned with the rails of the track to which it is to be transferred. The other trucks 82 will also rotate 90° since they are interconnected with each other by the tie members 181–183. The jacks are then retracted to lower the wheels 85, 86 of the car C into engagement with the track to which it is to be transferred.

It is apparent from the above that the car C does not require any turning radius when transferring from one track to another track and thus, can be readily maneuvered over a trackway having intersecting tracks located in close quarters, such as the tracks 50 and 51 located within the furnace A. This maneuverability in close quarters is important when replacing a vessel in the furnace A. In the event that the vessel B is not properly aligned laterally between the support 20, 21 while it is supported on the car C within the furnace A, the car C can be transferred from the track 50 to the track 51 extending parallel to the axis of the trunnions 18, 19 of the vessel B and moved laterally between the supports to a position in which the bearing members 24 and 25 are vertically aligned with the recessed portions of the supports 20 and 21, respectively, prior to lowering the vessel B upon the supports 20 and 21.

The transfer car C is adapted to be moved over the trackway D by drive means 70 comprising a drive unit 200 mounted on the inside flange of each of the channel members 82 of the trucks 62. Since all of the drive units 200 are identical, only the drive unit located at the near left side of FIG. 1 will be described in detail. The drive unit 200 referred to comprises a conventional rotary hydraulic motor 202 operatively connected to the flanged wheel 85 via a gear reduction unit 204. While the transfer car C shown employs a drive unit for rotating or driving the flanged wheel 85 of each truck 62, it will of course be understood that a lesser number of drive units may be employed. Alternately, electric motors may be employed in place of the hydraulic motors shown.

Figure 4:
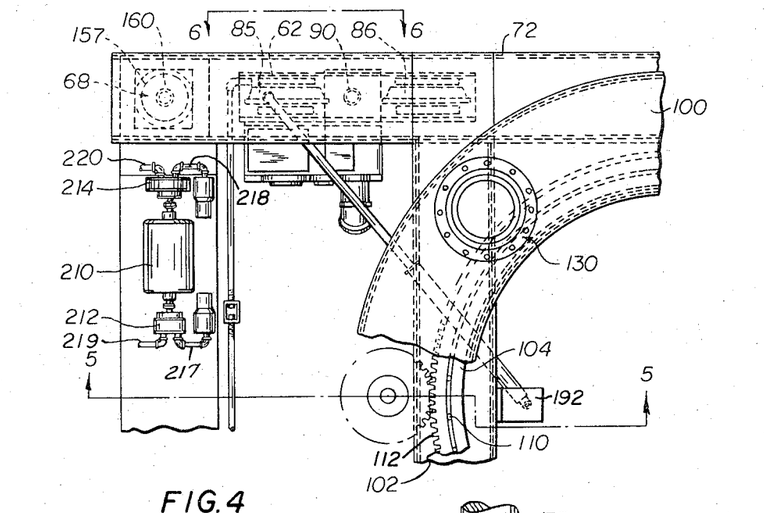
FIG. 4 is an enlarged fragmentary plan view of the transfer car shown in the preceding figures.

The hydraulic fluid for operating the various hydraulically actuated elements and mechanisms described above is supplied by a suitable hydraulic system which includes an electric motor 210 supplied by electric current in a suitable manner for example, a flexible conductor, a first pump 212 operatively connected with the motor at one end and a second larger or higher volume pump 214 operatively connected to the motor at the other end. Both the motor 210 and the pumps 212, 214 are mounted on the upper portion of the leftmost transverse member 75 of the frame 60, as viewed in FIG. 4. The system further includes a fluid reservoir 216 located within the hollow transverse member 75 from which fluid is drawn by the pumps 212 and 214. Suitable conduit means are provided for communicating the reservoir 216 and the inlets 217 and 218 of the pumps 212 and 214, respectively.

The outlets 219 and 220 of the pumps 212 and 214, respectively, are adapted to be combined and connected via suitable conduit means and control mechanisms, not shown, to the fluid motor 188, the extensible elements 130, the jacks 68, the drive unit 116 and the drive units 200. Also, suitable return conduit means and control mechanisms are provided for returning hydraulic fluid exhausted from the various hydraulically actuated components to the reservoir 216. To insure an equal distribution of hydraulic fluid to all of the elements 130, suitable flow dividing means may be employed. A suitable control station, not shown, for controlling the flow of hydraulic fluid to the various elements and mechanisms is preferably provided at a remote location or mounted on the car C.

The conduit means for supplying hydraulic fluid to the extensible elements 130 will preferably comprise, at least in part, flexible hoses, since the platform 64 upon which they are supported is adapted to be rotated a limited angular distance about its vertical axis.

Figure 11:
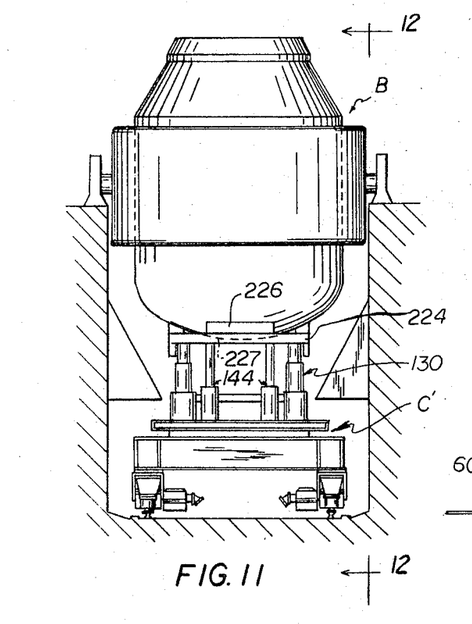
FIG. 11 is a front elevational view of a modified transfer car.
Figure 12:
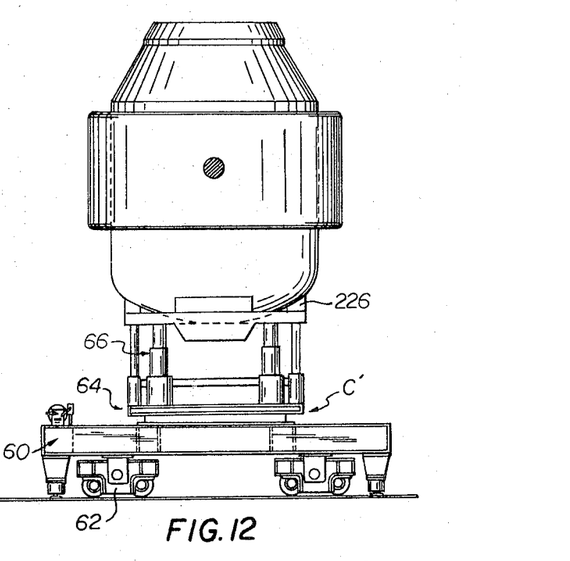
FIG. 12 is a side elevational view of the transfer car shown in FIG. 11 approximately on the line 12—12 of FIG. 11.

FIGS. 11 and 12 show a modified transfer car or vehicle C' which may be employed in place of the transfer car C. The transfer car C' is similar to the transfer car C, previously described, except that the upper ends of all of the extensible elements 130 and the rods 146 of the safety devices 144 are rigidly secured to an angular ring or member 224. The ring 224 further contains a plurality of spaced arcuate members 226 rigidly secured to the upper surface of the ring 224. The diameter of the ring 224 is such that the members 226 will engage the vessel B adjacent its bottom 227 when the hoist mechanism 66 is extended rather than the trunnion ring or member 17. By engaging the vessel B adjacent its bottom 227 rather than the annular member 17, the height to which the hoist mechanism 66 must be raised in order to lift the vessel B from its supports is reduced and thus, a hoist mechanism having a shorter stroke can be provided or one of the telescoping members 133–135 eliminated.

Figure 9:
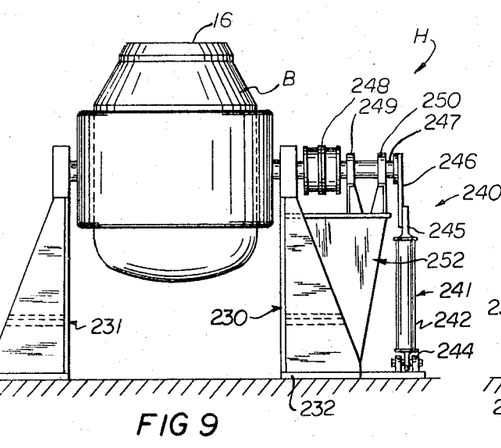
FIG. 9 is a front elevational view of a support stand approximately on line 9—9 of FIG. 3, employed with and forming part of the steel-making apparatus.

When the vessel B is removed from the furnace A and transported to the service area E or E', it may be left on the transfer car C, but is preferably positioned on a service and/or storage support stand H. The support stand H, shown, see FIGS. 9 and 10, comprises a pair of upwardly extending built up or fabricated frames 230, 231 disposed on opposite sides of the track 52 or 53. Since both frames are identical except as noted below, only the support stand 230 will be described in detail. The support frame 230 is generally triangular in shape and comprises a base member 232, a vertical member 233 rigidly secured to the midportion of the base member and a pair of inclined members 234, 235 forming an acute angle with the base and each having one end secured to one end of the base member. The three members 233–235 at their upper ends are rigidly connected to a trunnion mount 236 having an upwardly facing recess 237 which is complementary with the outer annular surface of the bearing members 24. The frame 230 also is provided with a plurality of transverse brace members to increase the structural rigidity thereof.

The support stand H further comprises a mechanism 240 for pivoting the vessel B about the axis of the trunnion 18, 19 when it is supported by the support stand. The mechanism 240 comprises a conventional double acting reciprocating fluid motor 241 having a cylinder 242 and a piston 243 slidably received therein. One end of the cylinder 242 is pivotally connected to a bracket 244 secured to the base member 232 of the frame 230. Rigidly secured to the piston 243 is a piston rod 245 which projects through an opening in the other end of the cylinder 242 and is pivotally connected to one end of a lever 246. The other end of the lever 246 is fixed on one end of a generally horizontally disposed shaft 247. The other end of the shaft 247 has fixed thereon one end of a detachable coupling 248, which end is complementary with the end of the coupling 26 fixed on the trunnion 19 and connectable therewith. The shaft 247 is rotatably supported within a pair of spaced annular bearing members 249 and 250, the bearing members in turn being supported by a built-up bracket arrangement 252 secured to the frame 230.

The fluid motor 241 is actuated by hydraulic fluid under pressure selectively supplied to the opposite ends of the cylinder 242 from any convenient or suitable source.

Figure 10:
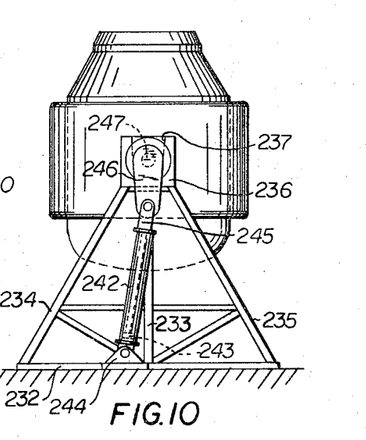
FIG. 10 is a side elevational view of a support stand illustrated in FIG. 9.

To pivot the vessel B when it is supported within the support stand H and the ends of the couplings 26 and 245 connected, from its upright position, as indicated by the solid lines in FIG. 10, to an inverted position for removing the lining, etc., as indicated by the phantom lines in FIG. 10, hydraulic fluid is supplied to the lower end of the cylinder 242 and exhausted from the upper end thereof to extend the piston rod 245 and rotate the lever 246 and the shaft 247 in a counterclockwise direction. To reposition the vessel to its upright position, hydraulic fluid is supplied to the upper end of the cylinder 242 and exhausted from its lower end to retract the piston rod 245 and rotate the lever 246 and the shaft 247 in a clockwise direction.

With respect to the particular location of the service and/or storage areas, it should be noted that if the service or storage area chosen is located along a track which extends parallel to the track 50, such as service area E' located along the track 53, the revolving platform 64 of the transfer car C can be eliminated and the hoist mechanism mounted directly on the frame 60. This is because the pivotal axis 32 of the vessel B while it is supported within the furnace A and transported over the trackway D by the transfer C will be parallel to the pivotal axis of the vessel when it is supported by a support stand H', shown in phantom lines in FIG. 3, located along the track 53 in the service area E'. This parallel relationship, however, only will exist if the support stand at the service and/or storage area is located along a track, such as track 53, which is parallel to the track 50. If the support stand at the service area is located along a track which is not parallel to the track 50, such as track 52, the transfer car C is provided with the revolving platform 64 for rotating the vessel B so that the trunnions 18, 19 thereof can be aligned with the recesess 237 of the support stand H prior to the vessel B being set upon the supports 230, 231.

It is to be understood that the trunnions 18, 19 and the annular bearing members 24, 25 may be disposed and supported within housings that are detachably mounted on the supports 20, 21 within the furnace and/or the support frames 230, 231 of the support stand H. The housings will preferably be provided with a flat undersurface for engagement with the supports so that the distance to which the vessel B must be lifted in order to remove it from its supports will be kept to an absolute minimum.

While the transfer car C or C', as shown, is provided with a plurality of trucks pivotal about generally vertical axes, the car C or C' could be provided with two sets of non-pivotally mounted trucks, i.e., a first plurality of trucks extending longitudinally of the frame 60 and a second plurality of trucks extending transversely of and perpendicularly to the first plurality of trucks. In the latter provision, the trucks would be supported from beneath the frame by suitable hydraulically actuated jacks selectively operable to raise and lower the trucks. To transfer the car from one track to another track, the car would be moved to the intersection of the two tracks, the trucks extending in the direction of the track to which the car is to be transferred lowered to engage the wheels thereof with that track and also support the car, and the trucks engaged with the track from which the car is to be transferred raised to disengage the wheels thereof from that track. If this latter provision is employed, the jacks 68 in the embodiment shown for raising the car above the tracks could be eliminated.

Furthermore, the transfer car C or C' could be provided with an internal combustion engine for the purpose of driving the pumps 212 and 214 to supply hydraulic fluid to operate the various hydraulically actuated components of the car C or C' in place of the electric motor 210 shown.

It is also to be understood that the vessel B could be pivoted when it is supported by the support stand H via a rack and pinion arrangement in which the pinion is mounted on the shaft 247 and the rack reciprocated by a motor means.

Additionally, a plurality of transfer cars C or C' could be employed for removing and replacing vessels within a furnace so as to further minimize the amount of time the furnace need be shut down.

Alternately, the transfer car C or C' could be provided with a smaller frame and a larger revolvable platform wherein both the platform and the frame would be connected together for pivotal movement relative to each other about a common vertical axis. In such an arrangement, the platform would be provided with downwardly extending jacks, like jacks 68, for raising and lowering the car and drive means provided for rotating the frame and the wheeled trucks carried thereby whenever it is sired to transfer the car from one track to another track.

While in the preferred apparatus shown for practicing the invention the steel-making vessel B and its trunnion ring member 17 are removed as a unit after disconnecting the drive for rotating the vessel, it will be apparent that with the vessel suitably supported, as by the car C', the front part of a suitably constructed trunnion ring can be removed and the vessel removed from the furnace without the trunnion ring being affixed thereto and without disturbing the trunnion bearings, etc. Alternatively, the drive need not be disconnected, except for the power connections, and can be removed along with the vessel and its trunnion ring. As a still further alternative arrangement, the support stands 20, 21 could be provided with wheels and the vessel, trunnion ring, trunnion bearings, vessel drive and support stands, etc. removed as a unit or as an assembly from the furnace to the storage and/or service area. In other words, the vessel including its drive, supporting stands, etc. could be incorporated in or formed as a part of a removable car.

From the foregoing, it is apparent that novel apparatus for making steel and a method of operating the same have been provided which will enable a steel-making furnace having a unitary steel-making vessel to be operated continuously or substantially continuously at rated capacity. It is also apparent that a novel transfer apparatus has been provided for moving a steel-making vessel from the furnace proper and transporting it to a service and/or storage area for relining, etc., and for replacing the vessel removed by a spare or second vessel.

While the preferred form of the invention has been described in considerable detail, it will be apparent that the invention is not limited to the construction shown and it is our intention to cover hereby all adaptations, modifications and changes therein which come within the practice of those skilled in the art to which the invention relates and the scope of the appended claims.

Having described our invention, we claim:

1. In steel-making apparatus: a furnace installation comprising a discrete steel-making vessel supported therein; a trackway including a first track extending from outside of said furnace to within said furnace beneath said vessel; a second track intersecting said first track; a track vehicle operable on said trackway for moving said vessel from said furnace; said track vehicle comprising a generally horizontal frame having at least one truck pivotally connected therewith for movement about a generally vertical axis and adapted to engage said tracks of said trackway; downwardly extensible hydraulic jack means operatively connected to said frame; means to actuate said jack means to lift said vehicle and said truck from engagement with one track of said trackway; means for rotating said truck to a position above the other of said tracks; and means to actuate said jack means to lower said vehicle to engage said other of said tracks.

2. In steel-making apparatus: a furnace installation comprising a discrete steel-making vessel supported therein; a trackway including a first track extending from outside of said furnace to within said furnace; a second track intersecting said first track; a track vehicle operable on said trackway for moving said vessel from said furnace; said track vehicle comprising a generally horizontal frame having four trucks each pivotally connected therewith for movement about generally vertical axes and adapted to engage said tracks of said trackway; downwardly extensible hydraulic jack means operatively connected to said frame; means to actuate said jack means to lift said vehicle from enggement with one track of said trackway; means for rotating said trucks to a position above another of said tracks; and means to actuate said jack means to lower said vehicle to engage said other of said tracks.

3. In steel-making apparatus: a furnace comprising a discrete steel-making vessel removably supported therein; a trackway including a first track extending from outside of said furnace to within said furnace beneath said vessel; a second track extending from said remote location and intersecting said first track outside of said furnace; a track vehicle operable on said trackway for removing and transporting said vessel from said furnace to said remote location; said track vehicle comprising a generally horizontal frame having at least one truck pivotally connected therewith for movement about a vertical axis and engaging said trackway; downwardly extensible hydraulic jack means operatively connected to said frame; means to actuate said jack to lift said vehicle from engagement with one track of said trackway; means for rotating said truck to a position above another of said tracks; means to actuate said jack to lower said vehicle to engage said other of said tracks; upwardly extensible hydraulic jack means operatively connected to said frame; means to actuate said upwardly extensible jack to engage said vessel and lift said vessel from its supports in said furnace when said track vehicle is located beneath said vessel.

4. In steel-making apparatus: a furnace comprising a discrete steel-making vessel detachably supported therein; said furnace having an access opening large enough to permit said vessel to be removed from said furnace through said opening to a remote location; a trackway including a first track extending from outside of said furnace through said access opening to beneath said vessel; a second track beneath said vessel and extending perpendicular to said first track; a third track extending from said remote location and intersecting said first track outside of said furnace; a track vehicle operable on said trackway for removing and transporting said vessel from said furnace to said remote location; said track vehicle comprising a generally horizontal frame having at least one truck pivotally connected therewith for movement about a vertical axis and engaging said trackway, a plurality of downwardly extensible hydraulic jacks connected to said frame; means to actuate said jacks to lift said vehicle from engagement with one track of said trackway; means for rotating said truck to a position above another of said tracks; means to actuate said jacks to lower said vehicle to engage said other of said tracks; upwardly extensible hydraulic jack means on said frame; means to actuate said upwardly extensible jack means to engage said vessel and lift said vessel from its supports in said furnace when said track vehicle is located beneath said vessel; and power means to move said vehicle along said tracks of said trackway.

5. A track vehicle for transporting a readily removable steel-making vessel from a position within a steel-making furnace to a remote position, or vice versa, over a trackway including a first track and a second track intersecting said first track comprising: a generally horizontal frame having at least one truck pivotally connected therewith for movement about a generally vertical axis and engaging said trackway; means for transferring said vehicle from one of said tracks to the other of said tracks when said vehicle is at their intersection; said last-named means including downwardly extensible means operatively connected to said frame; means to actuate said downwardly extensible means to lift said vehicle from engagement with one track on which it is supported; means for rotating said truck to a position above the other of said tracks; and means to actuate said downwardly extensible means to lower said vehicle to engage the other of said tracks; upwardly extensible means operatively connected to said frame; means to actuate said upwardly extensible means to engage and lift a vessel from its support when said track vehicle is located beneath said vessel.

6. A track vehicle for transporting a readily removable steel-making vessel from a position within a steel-making furnace to a remote position, or vice versa, over a trackway including a first track extending from beneath the vessel position within said furnace to a location outside of said furnace and a second track intersecting said first track comprising: a generally horizontal frame having at least one truck pivotally connected therewith for movement about a generally vertical axis and engaging said trackway; means for transferring said vehicle from one of said tracks to the other when said vehicle is at the intersection of one with the other; said last-named means including downwardly extensible jack means operatively connected with said frame; means to actuate said jack means to lift said vehicle from engagement with one track on which it is supported; means for rotating said truck to a position above the other of said tracks; means to actuate said jack; means to lower said vehicle onto the other of said tracks; upwardly extensible means operatively connected to said frame; means to actuate said upwardly extensible means to engage and lift a steel-making vessel from its support when said track vehicle is located beneath said vessel.

7. A track vehicle for transporting a readily removable steel-making vessel from a position within a steel-making furnace to a remote position, or vice versa, over a trackway including a first track extending from beneath the vessel position within said furnace to a location outside of said furnace and a second track intersecting said first track comprising: a generally horizontal frame having at least one truck pivotally connected therewith for movement about a generally vertical axis and engaging said trackway; means for transferring said vehicle from one of said tracks to the other of said tracks when said vehicle is at the intersection thereof; said last-named means including downwardly extensible hydraulic jacks operatively connected with said frame; means to actuate said jacks to lift said vehicle from engagement with one track on which it is supported; means for rotating said truck to a position above the other of said tracks; means to actuate said jacks to lower said vehicle to engage the other of said tracks; upwardly extensible hydraulic jack means operatively connected to said frame; means to actuate said upwardly extensible hydraulic jacks to engage and lift a vessel from its support when said track vehicle is located beneath said vessel; and power means to move said vehicle along said trackway between said positions.

8. A track vehicle for transporting a readily removable steel-making vessel from a position within a steel-making furnace to a remote position, or vice versa, over a trackway including a first track extending from beneath the vessel position within said furnace to a location outside of said furnace and a second track intersecting said first track comprising: a generally horizontal frame having at least one truck pivotally connected therewith for movement about a generally vertical axis and engaging said trackway; means for transferring said vehicle from one of said tracks to the other of said tracks when said vehicle is at the intersection thereof; said last-named means including downwardly extensible jacks operatively connected with said frame, means to actuate said jacks to lift said vehicle from engagement with one track on which it is supported, means for rotating said truck to a position in which they are above the other of said tracks; means to actuate said jacks to lower said vehicle to engage the other of said tracks; a platform supported on said frame for movement about a generally vertical axis; extensible means operatively connected with said platform; means to actuate said upwardly extensible means to engage and lift a vessel from its support when said track vehicle is located beneath said vessel; and power means to move said vehicle along said trackway between said positions.

9. A track vehicle for transporting a readily removable steel-making vessel from a position within a steel-making furnace to a remote position, or vice versa, over a trackway including a first track extending from beneath the vessel position within said furnace to a location outside of said furnace and a second track intersecting said first track comprising: a generally horizontal frame having at least one truck pivotally connected therewith for movement about a generally vertical axis and engaging said trackway; means for transferring said vehicle from one of said tracks to the other of said tracks when said vehicle is at the intersection thereof; said last-named means including downwardly extensible hydraulic jacks operatively connected with said frame; means to actuate said jacks to lift said vehicle from engagement with one track on which it is supported; means for rotating said truck to a position above the other of said tracks; means to actuate said jacks to lower said vehicle to engage the other of said tracks; upwardly extensible hydraulic jack means operatively connected to said frame; means to actuate said upwardly extensible hydraulic jacks to engage and lift a vessel from its support when said track vehicle is located beneath said vessel; means operatively connected to said frame and movable with said upwardly extensible jacks to prevent said vessel from being dropped while in a lifted position in the event of a collapse of the upwardly extensible jacks; and power means to move said vehicle along said trackway between said positions.

10. The apparatus of claim 4 including a plurality of trucks pivotally connected to the frame for movement about vertical axes and engaging said trackway.

11. The vehicle of claim 8 including a plurality of trucks pivotally connected to the frame for movement about vertical axes and engaging said trackway.

12. The apparatus of claim 1 including a plurality of trucks pivotally connected to the frame for movement about vertical axes and engaging said trackway.

13. In a method of operating a steel-making furnace installation of the basic oxygen type in which the installation includes an area for service or storage of steel-making vessels, an area for making steel, a trackway from the steel-making area, and an intersecting trackway leading to the service or storage area, the steps comprising: supporting a steel-making vessel with wheels upon the first mentioned trackway, said wheels being rotatable about horizontal axes; moving the vessel along the first mentioned trackway from the steel-making area; stopping the movement directly over the intersection between the said trackways; and changing the direction of movement of the vessel by raising the wheels from the first mentioned trackway, pivoting the axis of rotating of the wheels about a vertical axis and lowering the wheels to the intersecting trackway; and then moving the vessel along the intersecting trackway to the service or storage area; and thereafter moving a different steel-making vessel from the service or storage area along the trackways to the steel-making area.

References Cited by the Examiner

UNITED STATES PATENTS

| 1,423,947 | 7/1922 | Kramer et al. | 214—16.18 |
| 2,696,663 | 12/1954 | Wright et al. | |
| 2,803,450 | 8/1957 | McFeaters | 266—35 |
| 3,031,177 | 4/1962 | Hofmeister | 266—36 |
| 3,137,244 | 6/1964 | Holley et al. | 105—177 |

BENJAMIN HENKIN, *Primary Examiner.*